Figure 1:
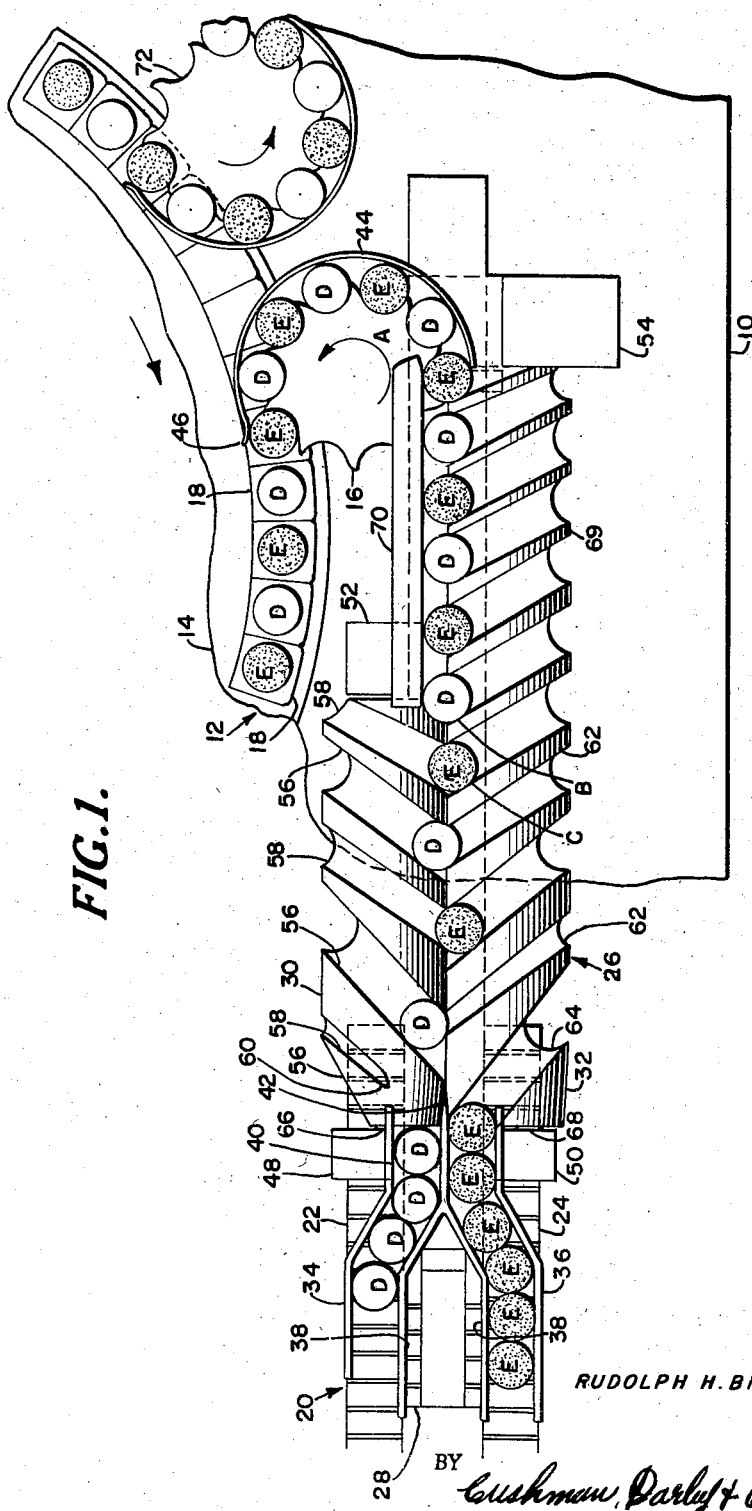

Oct. 21, 1958  R. H. BREEBACK  2,857,037
CONTAINER FEEDING MECHANISM
Filed April 9, 1956  2 Sheets-Sheet 1

INVENTOR
RUDOLPH H. BREEBACK
BY Cushman, Darby & Cushman
ATTORNEYS

Oct. 21, 1958 R. H. BREEBACK 2,857,037
CONTAINER FEEDING MECHANISM
Filed April 9, 1956 2 Sheets-Sheet 2

INVENTOR
RUDOLPH H. BREEBACK
BY Cushman, Darby & Cushman
ATTORNEYS

United States Patent Office 2,857,037
Patented Oct. 21, 1958

2,857,037

CONTAINER FEEDING MECHANISM

Rudolph Henry Breeback, Baltimore, Md., assignor to Crown Cork & Seal Company, Inc., Baltimore, Md., a corporation of New York Application April 9, 1956, Serial No. 576,955

21 Claims. (Cl. 198—32)

The present invention relates to an article feeding mechanism and, more particularly, to a mechanism for arranging articles in a particular manner while being transferred from one station to another station.

In transferring containers such as bottles, cans, or cartons from one machine to another such as from a soaker or washer to a filling machine and then to case loading machines, problems in transferring the articles are presented when the articles being transferred are combined from a plurality of rows into a single row, or when the articles are divided from a single row into a plurality of rows. High speed filling machines in bottling or canning plants require high speed transportation of containers to and from the same and, consequently, oftentimes it is necessary to feed two or more rows of containers from slower operating machines to the filling machine or, conversely, it is necessary to divide a single row of containers fed from the filling machine into two or more rows to be received by slower operating machines. The containers must be so handled that there is as little scuffing and marring as possible when they are combined or divided. Another problem in combining or dividing containers at high speeds develops in that the containers, which by themselves are not too stable, have a tendency to upset and jam the mechanisms, causing stoppage in the production line.

An object of the present invention is to provide a mechanism which ovbiates the aforementioned problems when operating to combine or divide articles even if the articles are transferred at high speeds.

Another object of the present invention is the provision of a mechanism for smoothly and efficiently combining a plurality of rows of articles into a single row.

Still another object of the present invention is to provide a mechanism for smoothly and efficiently dividing a single row of articles into a plurality of rows.

A further object of the present invention is to provide an article feeding mechanism which is essentially free from jamming or upsetting of the articles when combining or dividing rows of articles, even if articles are travelling at very high linear speeds, the speeds being varied during the course of operation.

Still another object of the present invention is to provide an article feeding mechanism wherein the articles being transferred are positively held even during the actual combining and dividing operation.

Still another object of the present invention is to provide a mechanism for combining rows of articles and, once the articles have been placed in a single row, then spacing the articles apart and maintaining them in spaced relationship until the articles have been transferred to other mechanisms.

A still further object of the invention is to provide an article feeding mechanism which will combine articles in a particular sequence even though flow of articles from one source of supply is temporarily discontinued.

Figure 2:
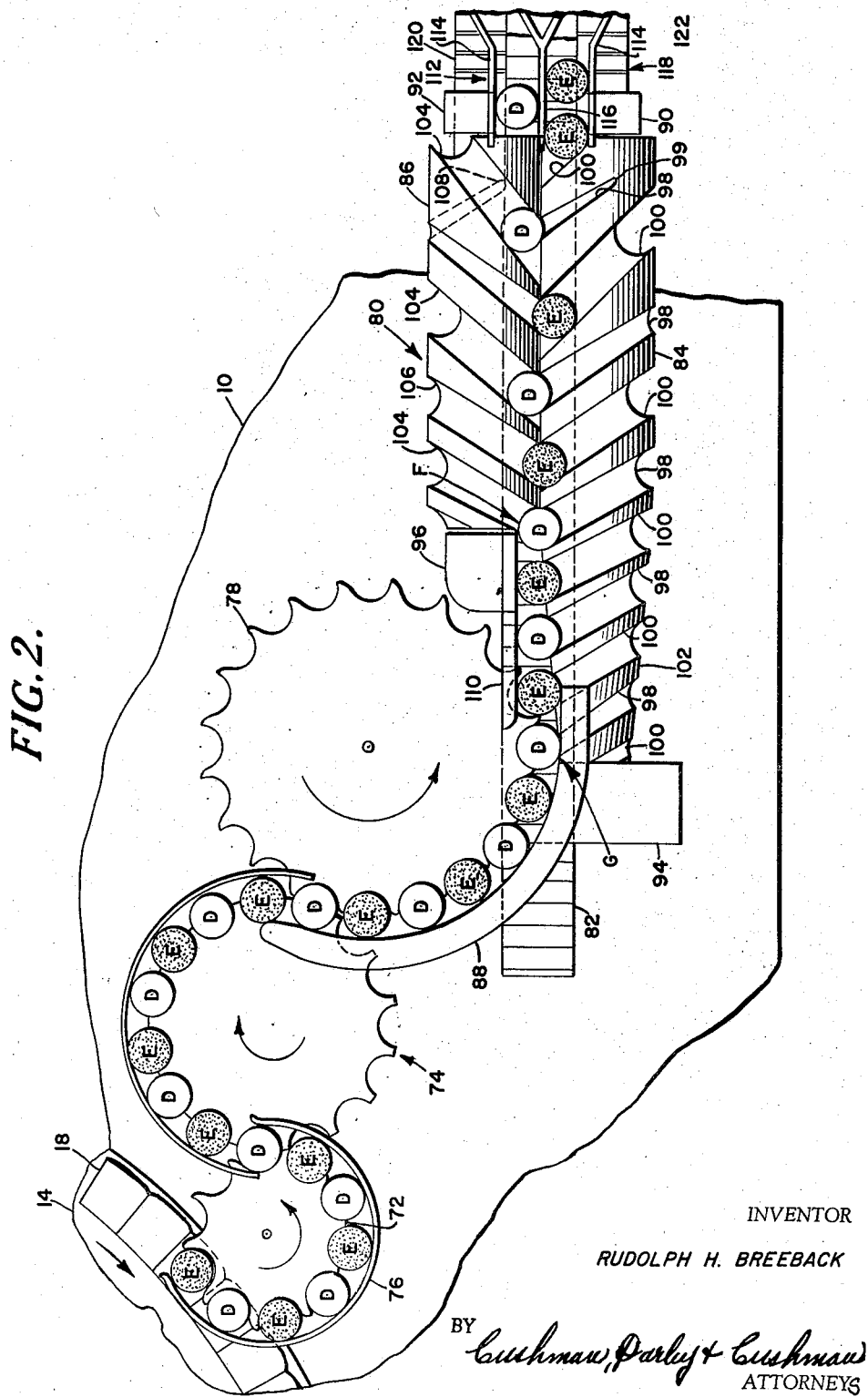

These and other objects of the present invention appear more fully in the following specification, claims, and drawings in which:

Figure 1 is a schematic plan view of an article feeding mechanism of the present invention used in transfer relationship to the infeed of a filling machine; and Figure 2 is a schematic plan view of an article feeding mechanism of the present invention used in transfer relationship to the outfeed of a filling machine.

Referring specifically to the drawings wherein like character or reference numerals represent like or similar parts, the article feeding mechanism of the present invention disclosed in Figure 1 is shown combining separate rows of articles from separate sources of supply into a single row of articles, the articles travelling in the direction of the arrows and being transferred to the infeed dial of a filling machine. On the other hand, Figure 2 discloses the article feeding mechanism of the present invention used in association with the outfeed of a filling machine, the article feeding mechanism receiving a single row of articles from the filling machine and dividing the row into plural rows of articles.

Although the embodiment of the invention is disclosed herein as being used in connection with filling machines of bottling or canning plants, it is within the scope of the present invention to use it wherever it is desired to combine rows of articles or divide a single row of articles into a plurality of rows of articles. Certainly, it would appear obvious that wherever articles are being fed from a single machine to a plurality of machines or, conversely, from a plurality of machines to a single machine, the article transfer mechanism of the present invention could be utilized.

Referring now specifically to Figure 1, the mechanism of the present invention may be supported on an upper surface of any suitable table structure such as the table structure provided on the stationary base structure 10 of a rotary filling machine, generally indicated at 12. In accordance with the usual practice, the rotary filling machine 12 is provided with a rotating table 14 journalled for rotation about a vertical axis fixed with respect to the filling machine base structure 10. An infeed dial 16 is also journalled for rotation on the base structure 10 and is adapted to successively deliver containers to the usual vertically movable container supporting platforms 18 as the platforms move past the infeed dial. The arrow A indicates the direction of travel of containers carried by the infeed dial 16.

The mechanism of the present invention includes a first conveyor structure generally indicated at 20, the first conveyor structure being formed of two container conveyor elements 22 and 24 respectively. The conveyor elements 22 and 24 are straight line endless link-type conveyors formed of flat plates and are suitably guided across the top surface of the filling machine base structure or work table 10. Each of the conveyor elements 22 and 24 in the embodiment disclosed in Figure 1 is adapted to handle containers being conveyed in rows from separate sources of supply, such as separate bottle washing or can rinsing apparatus (not shown).

A second conveyor structure generally indicated at 26 is in transfer relationship with conveyor structure 20 and is the mechanism which receives the two rows of containers and combines them into a single row. Conveyor structure 26 includes a container conveyor element 28 suitably guided on the upper surface of table structure 10 and a pair of article movement controlling helical or spiral conveyor elements 30 and 32 positioned above and longitudinally of conveyor element 28 and also opposing each other on opposite sides of conveying element 28, as will be explained in more detail later in the specification.

One end of conveyor element 28 is positioned between the ends of conveyor elements 22 and 24 and is adapted to receive containers therefrom while the other end of conveyor element 28 extends under infeed dial 16 and cooperates therewith in positioning containers in the pockets of the infeed dial. Conveyor element 28 is similar in construction to conveyor elements 22 and 24 in that it is a straight line endless link-type conveyor formed of flat plates which are suitably guided on the upper surface of table structure 12.

Guide means including the converging guide rails 34 and 36 are provided adjacent the discharge end of conveyor structure 20 so as to guide the containers onto conveyor element 28 from the respective conveyor elements 22 and 24. A center guide rail element 38 cooperating with the guide rails 34 and 36 defines the path for the containers converging onto conveyor element 28. Guide rail element 38, at its point of convergence, is provided with rail-like element 40 extending centrally of conveyor 28 and terminating adjacent the ends of conveyor elements 30 and 32, as indicated at 42.

Guide means 44, having a radius concentric with the radius of infeed dial 16, extends from adjacent the end of conveyor element 32 to a position overlying the container supporting platforms 18, as indicated at 46. Guide means 44 retains the containers in pockets of infeed dial 16 until they are properly positioned on the container supporting platforms 18 of the filling machine.

The infeed ends of spiral conveyor elements 30 and 32 are journalled for rotation on a horizontal axis in the bearing blocks 48 and 50, respectively. The outfeed ends of the spiral conveyor elements 30 and 32 are journalled in the drive gear boxes 52 and 54, and are operatively connected by suitable gearing so that they will operate in synchronism with each other and in synchronism with the conveyor elements 22, 24 and 28 as well as infeed dial 16. The synchronism between the aforementioned elements will be more evident when the relative speeds are discussed below. All of the elements just mentioned preferably will be geared to the drive for filling table 14 and the infeed dial 16, although speed changing arrangements may be interposed to permit independent adjustment of the speed of travel of conveyor elements 22, 24 and 28, and also independent adjustment of speed of rotation of the screw conveyors 30 and 32, with respect to the remainder of the elements.

Referring now specifically to the spiral conveyor elements 30 and 32, it will be noted that each element is provided with a plurality of threads coextensive of its length. In more detail, spiral or screw conveyor element 30 is provided with a first thread 56 which extends from the infeed end of the element to the outfeed end of the element. Thread 56 is so arranged to have a relatively deep thread depth at its infeed end, the thread depth becoming progressively shallow as the thread extends toward the outfeed end. At conveyor element's infeed end the thread depth is substantially equal to a diameter of a container, whereas at the outfeed end, the thread depth is substantially equal to one-half the diameter of a container, the root diameter of the thread, thus, progressively increasing from the infeed end toward the outfeed end. A second thread 58 is interposed between the helices of thread 56 and begins approximately one-half pitch from the infeed end of conveyor element 30 as indicated at 60, and extends to the outfeed end. It will be noted that thread 58 is very shallow at the infeed end of spiral conveyor element 30, but progressively decreases in root diameter until the thread depth at the outfeed end is approximately one-half the diameter of a container.

Spiral conveyor element 32 is provided with a first thread 62 which is in phase with the thread 56 of spiral conveyor element 30. However, thread 62 is similar in arrangement to the previously described thread 58 in that it begins at approximately one-half pitch from the infeed end of conveyor element 32 and is very shallow at that point and progressively decreases in root diameter until it reaches a point indicated at B where its thread depth is approximately equal to one-half the diameter of a container. At a point B adjacent the outfeed end of conveyor element 30, the threads 56 and 62 which are in phase have root diameters substantially equal to each other and provide a pocket on the center or median line between the conveyor elements.

Spiral conveyor element 32 is provided with a second thread 64 which extends from the infeed end of the element intermediate the helices of thread 62. The thread 64 is similar in construction to the thread 56 of spiral conveyor element 30 in that at the infeed end, it has a thread depth approximately equal to a diameter of a container, the root diameter of the thread decreasing progressively until it reaches a thread depth of approximately one-half the diameter of a container at approximately the point C. Thread 64 is adapted to be in phase with the second thread 58 of conveyor element 30 and at the point C the thread depth of threads 64 and 58 are each equal to approximately one-half the diameter of a container and define an article receiving pocket positioned on the center or median line between the conveyor element.

As is now evident, threads of conveyor elements 30 and 32 which are in phase provide article receiving pockets for the containers. By having the threads that are in phase of progressively increasing and decreasing root diameters respectively, containers are received at the infeed end and are diverged toward a median line between the conveyor elements until they reach the point where both conveyor elements have thread depths of approximately one-half the diameter of the container. Since the containers are fed in separate rows on the conveyor elements 22 and 24, respectively, they will be alternately received by the lead threads 56 and 64 of the conveyor elements 30 and 32 respectively, as it will be noted that these threads are approximately 180° out of phase. For example, the containers D being transferred by conveyor element 22 to conveyor structure 26 will be received by the thread 56 on one side of a median line between the conveyor elements 30 and 32 and will be conveyed toward the median line until they are centered thereon. On the other hand, containers E being transferred by the conveyor element 24 to conveyor structure 26 will be received by the thread 64 of the conveyor element 32 on the opposite side of the median line between the spiral conveyor elements, the containers F being progressively transferred to the median line. As mentioned above, the threads 58 and 62 are in phase with the threads 64 and 56 respectively and after about a one-half turn of rotation of the spiral elements, the threads 58 will cooperate with the threads 64 and 56 respectively to form article receiving pockets and, thus, firmly hold the containers D and E in position, as they are being combined alternately of one another into a single row.

As clearly shown in Figure 1, the end portion 66 of spiral conveyor element 30 provides a stop or abutment for the containers D when thread 64 of spiral conveyor element 32 is in position to receive containers E. On the other hand, after spiral conveyor element has rotated approximately one-half turn, the thread 56 of conveyor element 30 will be in position to receive a container D and the end portion 68 of spiral conveyor element 32 will have rotated to a position where it blocks entry of containers E to the combining mechanism.

Spiral conveyor element 32 is longer than spiral conveyor element 30, the portion 69 extending beyond the conveyor element 30 being adapted to transfer the containers or other articles once they have been placed in a single row to the infeed dial 16. It will be noted that both threads 64 and 62 of spiral conveyor element 32 on its portion 69 have a constant root diameter of substantially one-half the diameter of a container. A guide element 70 having a vertical planar face opposes the portion 69 of spiral conveyor element 32 on the opposite side of straight line conveyor element 28 and extends from the end of spiral conveyor element 30 longitudinally of the conveyor 28 to a position overlying infeed dial 16. The guide element 70 retains containers in the pockets or threads until they are positively transferred into the pockets of infeed dial 16.

Referring now to the relative speed of the conveyor elements shown in Figure 1, if the filling machine is operating to handle containers at a linear speed of approximately 1394 inches per minute, then the straight line conveyor element 28 and the spiral conveyor elements 30 and 32 operate to transfer articles at the same linear speed. It is preferable that the pitch of the spiral conveyor element 32 at its outfeed end be constant and such that it will maintain the containers at a spacing which is equal to the spacing of the containers on the platforms 18 of the filling machine, for example, with axes of successive containers being three inches apart. Article conveyor elements 22 and 24 are arranged to transfer separate rows of containers to the point where they are received by the elements 30 and 32 at a linear speed in the order of 567 inches per minute. In other words, if the filling machine has a capacity to fill 420 containers per minute, and the soakers or washers from which the containers are fed to the filling machine deliver containers at 210 containers per minute, the mechanism of the present invention will combine the separate rows delivered at 210 containers per minute into a single row of containers which are delivered to the filling machine at the rate a which the filling machine is operating.

Referring specifically to Figure 2, the mechanism of the present invention is shown as being utilized to divide articles from a single row into a plurality of rows. In this embodiment of the invention, the container supporting platforms 18 carried by the rotary filling table 14 transfer the filled containers to an outfeed dial 72. As is the usual practice, outfeed dial 72, which is rotatably journalled on work table 10 and driven off of the filling machine drive, transfers the filled containers to a crowner mechanism generally indicated at 74 where the filled containers are closed. Suitable guide means 76 extending from a position over container supporting platforms 18 and concentric of outfeed dial 72 retains the containers in the pockets of the outfeed dial until the containers are received on the container supporting platforms of the crowner mechanism 72. After the containers are closed by the crowner mechanism 72, they are then transferred to a second outfeed dial 78, also rotatably supported on the table structure 10 and driven off of the filling machine drive. Outfeed dial 78 in turn transfers the containers in line to the dividing mechanism generally indicated at 80. Outfeed dials 72 and 78 and crowner mechanism 74 rotate in the directions indicated by the arrows in Figure 2 and maintain the containers spaced three inches apart.

The mechanism 80 is generally similar to the second conveyor structure 26 except that the containers are fed into the mechanism in an opposite direction, the units of the mechanism being operated in the reverse of the units of the conveyor structure 26.

In more detail, the dividing mechanism 80 is a conveyor structure including a straight line conveyor element 82 suitably guided on the upper surface of table structure 10 and a pair of helical or spiral conveyor elements 84 and 86 positioned above and longitudinally of the conveyor element 82 and which oppose each other on opposite sides of the conveyor element 82. Element 82 is similar to conveyor element 28 in that it also is a straight line endless link-type of conveyor, formed of flat plates suitably guided across the top surface of work table 10.

Spiral conveyor element 84 is slightly longer than spiral conveyor element 86 so that it may tangentially receive containers from the outfeed dial 78. A curved guide element 88 concentric with the axis of outfeed dial 78 and extending from a position over the path of containers on crowner mechanism 74 to a position over the spiral conveyor element 84 retains the containers in the pockets of the outfeed dial 78 as they are being conveyed from the crowner mechanism to the dividing mechanism 80.

Each of the elements 84 and 86 is provided with a plurality of threads coextensive of their length, a more detailed description of the threads following in the specification. Elements 84 and 86 are journalled at their outfeed ends in the bearing blocks 90 and 92 respectively, whereas the infeed ends of the elements are journalled in the drive gear boxes 94 and 96 respectively. The drive gear boxes 94 and 96 are operatively connected to suitable gearing so that they will drive the spiral conveyor elements 84 and 86 in synchronism with each other and with the straight line conveyor element 82 and the outfeed dial 78. The synchronism between the spiral conveyor elements 84 and 86 and the straight line conveyor 82 will be more evident when the relative speeds are discussed below. The conveyor elements of the dividing mechanism 80 will be geared to the drive for the filling table 14 so that the mechanism can be driven in synchronization with the outfeed dial 78, crowner mechanism 74 and outfeed dial 72. Speed changing arrangements may be interposed between the drive for the various elements of the dividing mechanism 80 so that independent adjustment of the speed of travel of these elements with respect to each other may be made.

Spiral conveyor element 84 is provided with a plurality of threads co-extensive of its length. In more detail, element 84 includes a first thread 98 and a second thread 100 interposed between the helices of the first thread. Thread 98 has a constant pitch and root diameter at the infeed end of element 84 until the thread is adjacent the point F which corresponds to the infeed of the shorter element 86. Thread 100 is similar to thread 98 in that it also has a constant pitch and root diameter until it reaches the point F. Conveyor element 84 may be tapered at its infeed end as indicated at 102 so that it can extend tangentially of outfeed dial 78. By having the threads 98 and 100 of uniform pitch and root diameter, the threads will pick up the spaced containers D and E as they are received from outfeed dial 78 and maintain them in spaced relationship until they are positioned between both spiral conveyor elements.

At the point F, the thread 98 has a thread depth equal to approximately one-half of the diameter of a container. From this point to the outfeed end, the pitch diameter of the thread 98 increases with a corresponding decrease in thread depth until the thread depth is negligible, as indicated at 99, and the thread ends at one-half pitch from the end of element 84. Thread 100, at the point F, also has a thread depth approximately equal to one-half the diameter of a container. From the point F and toward the outfeed end of conveyor element 84, thread 100 has a progressively decreasing root diameter and, consequently, an increasing thread depth. At the outfeed end of conveyor element 84, the thread depth of thread 100 has increased to where it is substantially equal to the diameter of a container.

Spiral conveyor element 86 is provided with a first thread 104 which is in phase throughout its length with the thread 98 of element 84. Thread 104 extends from the infeed end of conveyor element 84 toward the outfeed end and has a progressively decreasing root diameter. The thread depth at the infeed end of conveyor element 86 is substantially one-half the diameter of a container and it increases until at the outfeed end it is substantially equal to the diameter of a container.

A second thread 106 on conveyor element 86 is in phase throughout its length with thread 100 of conveyor element 84. Thread 106 which has a thread depth at the infeed end of conveyor element 86 substantially equal to one-half of the diameter of a container, progressively increases in root diameter to a point where the thread depth is negligible at a distance of substantially one-half the pitch of the thread, as indicated by the dotted lines at 108 in Figure 2.

As is now evident, containers D and E, which were combined into a single row prior to being transferred onto the container supporting platforms, are conveyed by outfeed dial 78 in space line relationship to one another and are received successively by the threads 98 and 100 of the conveyor element 84. A guide element 110 extending longitudinally of conveyor element 82 from a position over the outfeed dial 78 to a position adjacent the infeed end of conveyor element 86 opposes the portion of conveyor element 84 between dial 78 and conveyor element 86 and retains the containers in the pockets defined by threads 98 and 100 until the threads 104 and 106 respectively of element 86 receive the containers at the point F. Containers D, which are received in the threads 98 at the point G and are transferred to the point F, will begin to progressively diverge from the center or median line between conveyor elements 84 and 86 as the thread depth on the element 86 increases and the thread depth of the thread in phase therewith, namely thread 98, decreases. Containers E, on the other hand, are received in threads 100 of conveyor element 84 at point G and at the position F, the threads 106 of conveyor element 86 cooperating in phase with the threads 100, and will progressively diverge the containers E from the center or median line between conveyor elements 84 and 86 in an opposite direction to the direction of containers D. By the time the containers D and E reach the outfeed end of the spiral conveyor elements 84 and 86, they are positioned on opposite sides of the median line between the conveyor elements so that they are divided into two rows.

At the outfeed end of conveyor structure 80, a suitable guide rail structure 112, including the outer guide rails 114 and the inner guide rail element 116, may be provided to convey the containers D and E to a conveyor structure 118 similar to the conveyor structure 20. The conveyor structure 118 which includes separate straight line conveyors 120 and 122 transfers the containers in rows to separate casers or labelers, not shown, at a slower linear speed than the containers travel before division into the rows.

Referring now to the relative speed of the elements shown in Figure 2, if the filling table is operating to handle containers at a linear speed of 1394 inches per minute with the container axes spaced three inches apart, the elements 72, 74 and 78 will also be adapted to handle containers travelling at the aforementioned linear speed. Dividing mechanism 80 at its infeed end must be operated at a speed to receive the containers at the aforementioned linear speed. The pitch of the helices of the threads on spiral conveyor element 84 will control the linear speed of the container as they enter the outfeed end of the divider element. Preferably conveyor element 82 operates to transfer containers at this same linear speed. The conveyor structure 118, including its two conveyor elements 120 and 122, can operate at a slower speed than conveyor element 82 in that each of the elements 120 and 122 receive only half of the containers being divided. Elements 120 and 122 preferably operate to transfer containers at 567 inches per minute to the next machine which operates on the containers. Accordingly, if the filling machine has a capacity of filling containers at the rate of 420 containers per minute, the article feeding mechanism of the present invention used as a divider will divide the single row of containers into two rows, each row receiving 210 containers per minute. The containers may then be transferred at reduced linear speeds to slower operating machines such as the aforementioned labelers or casers.

It will be perceived that the mechanisms described in connection with Figures 1 and 2 of the drawings fulfill the stated objects of the invention and will enable containers or other articles to be either combined or divided with a minimum possibility of the containers or articles becoming upset, jammed or damaged. The containers being fed into the combining mechanism of Figure 1 in separate rows are maintained in a particular sequence throughout the combining operation and, thus, are placed on a particular series of filling platforms. In other words, the combining mechanism of Figure 1 will alternately combine containers D in between containers E, the containers D and E coming from separate sources. Should there be a stoppage in the supply of one or the other of the rows of containers, the containers from the other row will still maintain their proper spaced relationship as they are always received in the same cooperating threads of the combining mechanism. By having the containers combined in a particular sequence, the operator of the filling machine will always be aware of which series of platforms are without containers when a particular source of supply is stopped. This feature of sequential combining of containers is disclosed in my copending United States application, Serial No. 399,998, and entitled "Container Feeding Mechanism."

Although the present invention has been disclosed in connection with a rotary filling machine, it will be understood that it is within the scope and spirit of the invention to utilize the mechanism in any conveyor system where it is desired to either combine articles into a single row or divide articles into a plurality of rows.

The terminology used in this specification is for the purpose of description and not limitation, the scope of the invention being defined in the claims.

I claim:

1. In a mechanism of the character described, a helically threaded element provided with a plurality of threads co-extensive with each other through the length of said element, one of the threads of said element having a progressively increasing root diameter, while the other of said threads has a progressively decreasing root diameter from one end of said element toward the other end, a second helically threaded element opposed to said first mentioned helical element, said second helical element being provided with a plurality of threads co-extensive with each other through the length of said element, one of the threads of said second element having a progressively increasing root diameter and cooperating in phase with the thread of said first element having a progressively decreasing root diameter, the other of said threads of said second element having a progressively decreasing root diameter and cooperating in phase with the thread of said first element having a progressively increasing root diameter, article moving means in transfer relationship with said first and second elements, and means to drive said first and second elements in timed relationship with each other.

2. A mechanism of the character described in claim 1 wherein one of said helical elements has a portion thereof extending beyond the other of said helical elements, said portion being adapted to space articles in a row.

3. A mechanism of the character described in claim 1 wherein one of said helical elements has a portion thereof extending beyond the other of said helical elements, said portion having a constant root diameter.

4. A mechanism of the character described in claim 1 wherein one of said helical elements has a portion thereof extending beyond the other of said helical elements, said portion having a constant root diameter, said portion also having at least a constant pitch adjacent its end for equally spacing articles.

5. A mechanism of the character described in claim 1 including a pair of article moving means for moving articles in rows and cooperating with said first mentioned article moving means.

6. In a mechanism for arranging articles in the manner described, a first conveyor structure including a pair of helically threaded elements opposed to each other, each of said elements including a plurality of threads co-extensive of its length, each one of the plurality of co-extensive threads of one of said elements being in phase with one of the plurality of co-extensive threads of the other of said elements, each pair of in phase threads of said pair of elements defining article receiving pockets, the pockets defined by one pair of in phase threads having centers progressively approaching a median of said pair of elements from one side thereof, the pockets defined by another pair of in phase threads having centers approaching the median of said elements from the other side thereof, means to drive said pair of elements in timed relationship with each other, and a second conveyor structure in transfer relationship with said first conveyor structure.

7. A mechanism of the character described in claim 6 wherein said second conveyor structure includes means to feed rows of articles to said first conveyor structure.

8. A mechanism of the character described in claim 6 wherein said second conveyor structure receives articles in rows from said first conveyor structure.

9. A mechanism of the character described in claim 6 wherein said second conveyor structure includes means to feed rows of articles to said first conveyor structure, the articles being combined by said first conveyor structure, said first conveyor structure being driven in timed relationship with said second conveyor structure and increasing the linear speed of articles received from said second conveyor structure.

10. A mechanism of the character described in claim 6 wherein said second conveyor structure receives articles in rows from said first conveyor structure, the articles travelling at a linear speed on said second conveyor structure less than the linear speed when travelling in said first conveyor structure.

11. A mechanism of the character described in claim 6 wherein said helical elements are mounted for rotation on axes parallel to each other.

12. A mechanism of the character described in claim 6 wherein threads of said elements in phase with each other have progressively increasing and decreasing root diameters.

13. A mechanism of the character described in claim 12 wherein the threads having progressively increasing root diameters increase to a thread depth of substantially one-half the diameter of an article being conveyed and wherein threads having progressively decreasing root diameters decrease to a thread depth of substantially one-half the diameter of an article being conveyed.

14. A conveyor combiner mechanism for arranging articles from separate sources into a single row of articles comprising a first conveyor structure for conveying articles in rows from separate sources, a second conveyor structure for receiving articles in rows from said first conveyor structure and combining articles into a single row, said second conveyor structure including a straight line conveyor and a pair of opposed helical conveyor elements positioned on opposite sides of and in longitudinal alignment with said straight line conveyor, said conveyor elements having infeed and outfeed ends, each of said conveyor elements including a first helical thread extending throughout its length, said first helical threads of said conveyor elements being in phase with each other and defining article receiving pockets, the first helical thread of one of said conveyor elements having a progressively increasing root diameter from its infeed end and the first helical thread of the other of said conveyor elements having a progressively decreasing root diameter from its infeed end for at least a portion of its length, each of said conveyor elements having a second helical thread interposed between said first helical thread and extending throughout its length, said second helical threads of said conveyor elements being in phase with each other and defining article receiving pockets, the second helical thread of one of said conveyor elements having a progressively decreasing root diameter from its infeed end and the second helical thread of the other of said elements having a progressively increasing root diameter from its infeed end for at least a portion of its length, and means to drive said elements in timed relationship with each other.

15. A mechanism of the character described in claim 14 wherein said first conveyor structure includes a pair of straight line conveyors and guide means for transferring articles from the pair of straight line conveyors toward said first mentioned straight line conveyor.

16. A mechanism of the character described in claim 14 wherein one of said conveyor elements has a portion thereof extending beyond the other at their outfeed end, the first and second threads of said portion having a constant root diameter and at least a constant pitch adjacent its end for equally spacing articles in a single row.

17. A mechanism of the character described in claim 14 wherein said second conveyor structure increases the linear speed of articles being transferred from said first conveyor structure.

18. A conveyor divider mechanism for dividing articles travelling in a single row into a plurality of rows comprising a first conveyor structure for receiving articles in a single row and arranging them in plural rows, said first conveyor and a pair of opposed helical conveyor elements positioned on opposite sides of and in longitudinal alignment with said straight line conveyor, said conveyor elements having infeed and outfeed ends, each of said conveyor elements including a first helical thread extending throughout its length, said first helical threads of said conveyor elements being in phase with each other and defining article receiving pockets, the first helical thread of one of said conveyor elements having a thread depth of substantially one-half the diameter of an article at its infeed end and progressively increasing in depth and the first helical thread of the other of said conveyor elements having a thread depth of substantially one-half of an article at its infeed end and progressively decreasing in depth, each of said conveyor elements having a second helical thread interposed between said first helical thread and extending throughout its length, said second helical threads of said conveyor elements being in phase with each other and defining article receiving pockets, the second helical thread of the conveyor element interposed between the first helical thread of increasing depth having a thread depth of substantially one-half of an article at its infeed end and progressively decreasing in depth, and the second helical thread interposed between the first helical thread of decreasing depth having a thread depth of substantially one-half of an article at its infeed end and progressively increasing in depth, means to drive said conveyor elements in timed relationship with each other and with said straight line conveyor, and a second conveyor structure for receving rows of articles from said first conveyor structure.

19. A mechanism of the character described in claim 18 wherein said second conveyor structure decreases the linear speed of articles being transferred from said first conveyor structure.

20. In a mechanism for arranging articles in the manner described, a first conveyor structure including a pair of opposed conveyor elements, each of said conveyor elements including means to define a plurality of helical paths coextensive of the length of the elements, each one of the plurality of coextensive helical paths of one of said elements being in phase with one of the plurality of coextensive threads of the other of said elements, each pair of in phase helical paths of said pair of elements defining means for engaging and effecting movement of articles, one pair of phase helical paths of said elements moving articles in a path approaching a median of said elements from one side thereof and another pair of in phase helical paths moving articles in a path approaching the median of said elements from another side thereof, means to drive said pair of conveyor elements in timed relationship with each other, and a second conveyor structure in transfer relationship with said first conveyor structure.

21. In a mechanism of the character described, a pair of opposed article movement controlling conveyor elements for engaging and moving articles therebetween, said conveyor elements having means coacting to define a first series of movable pockets and means coacting to define a second series of movable pockets alternately spaced longitudinally of the conveyor elements with respect to said first series of movable pockets, said first series of movable pockets being adapted to move in a path at an angle to a median of said opposed conveyor elements and said second series of movable pockets adapted to move at an angle to the median of said opposed conveyor elements on the opposite side of the median.

References Cited in the file of this patent

UNITED STATES PATENTS

| | | |
|---|---|---|
| 1,750,329 | Patchen | Mar. 11, 1930 |
| 2,377,431 | Lakso | June 5, 1945 |
| 2,470,052 | Rundell | May 10, 1949 |

FOREIGN PATENTS

| | | |
|---|---|---|
| 704,938 | France | May 28, 1931 |